Nov. 4, 1969  H. S. HAWKINS  3,476,159
WORK FEED MECHANISM FOR BANDSAW MACHINES
Filed March 10, 1967  4 Sheets-Sheet 2
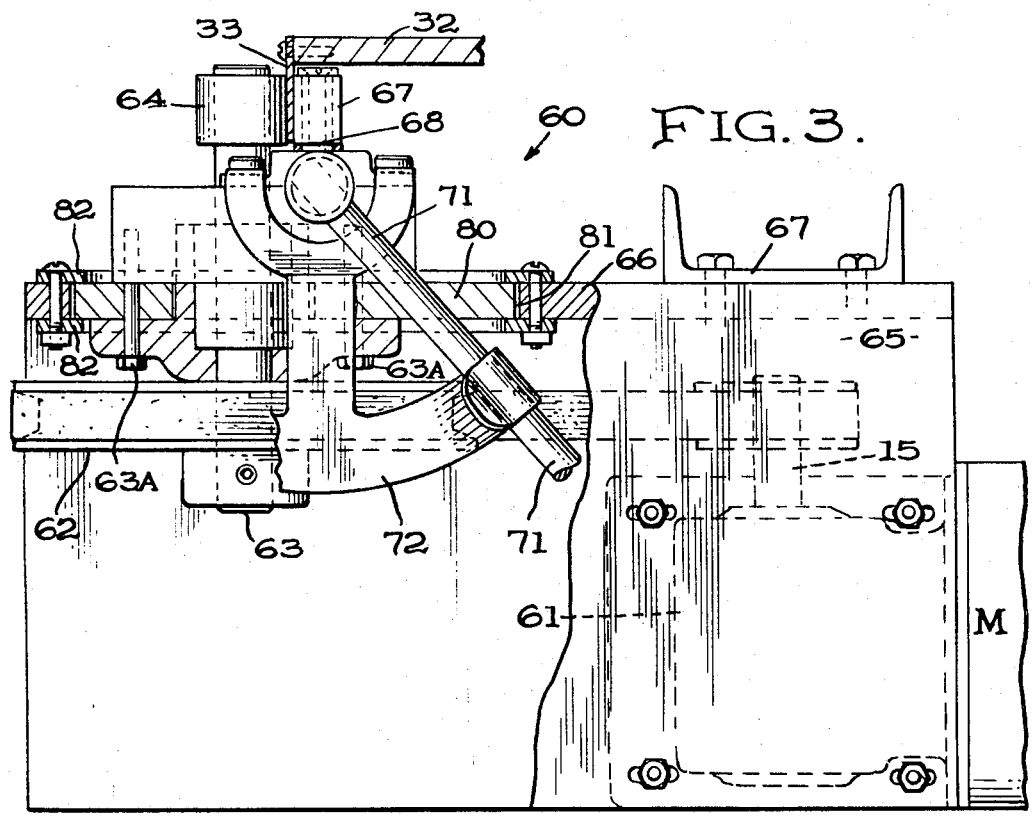
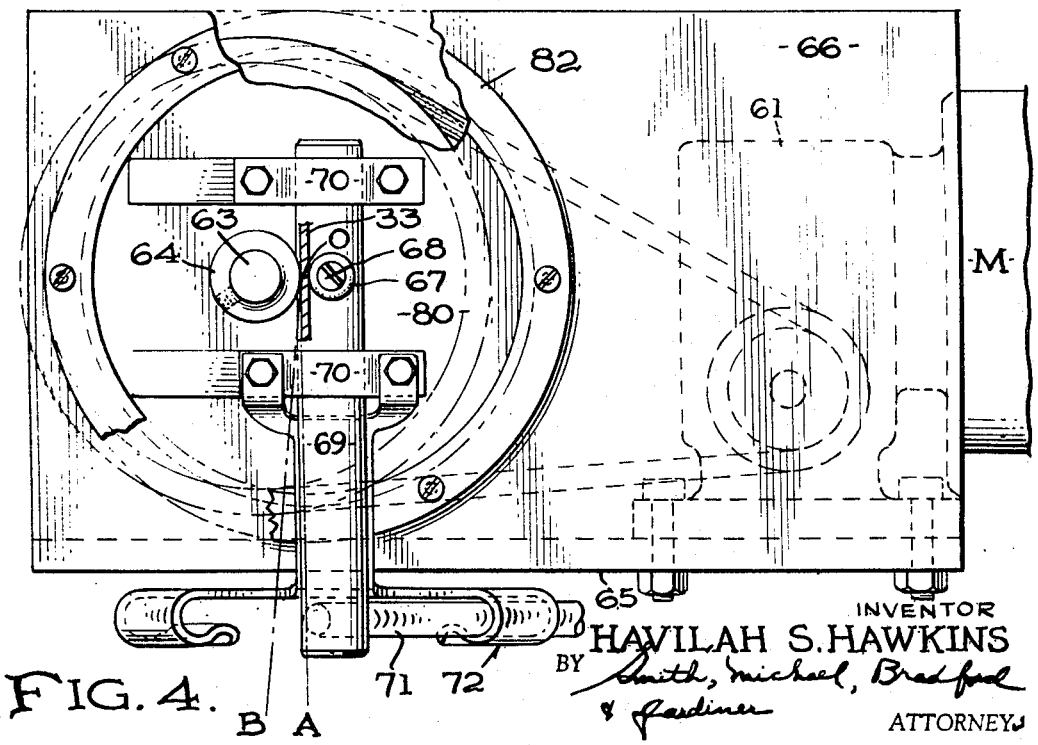
INVENTOR
HAVILAH S. HAWKINS
BY Smith, Michael, Bradford & Gardiner
ATTORNEYS

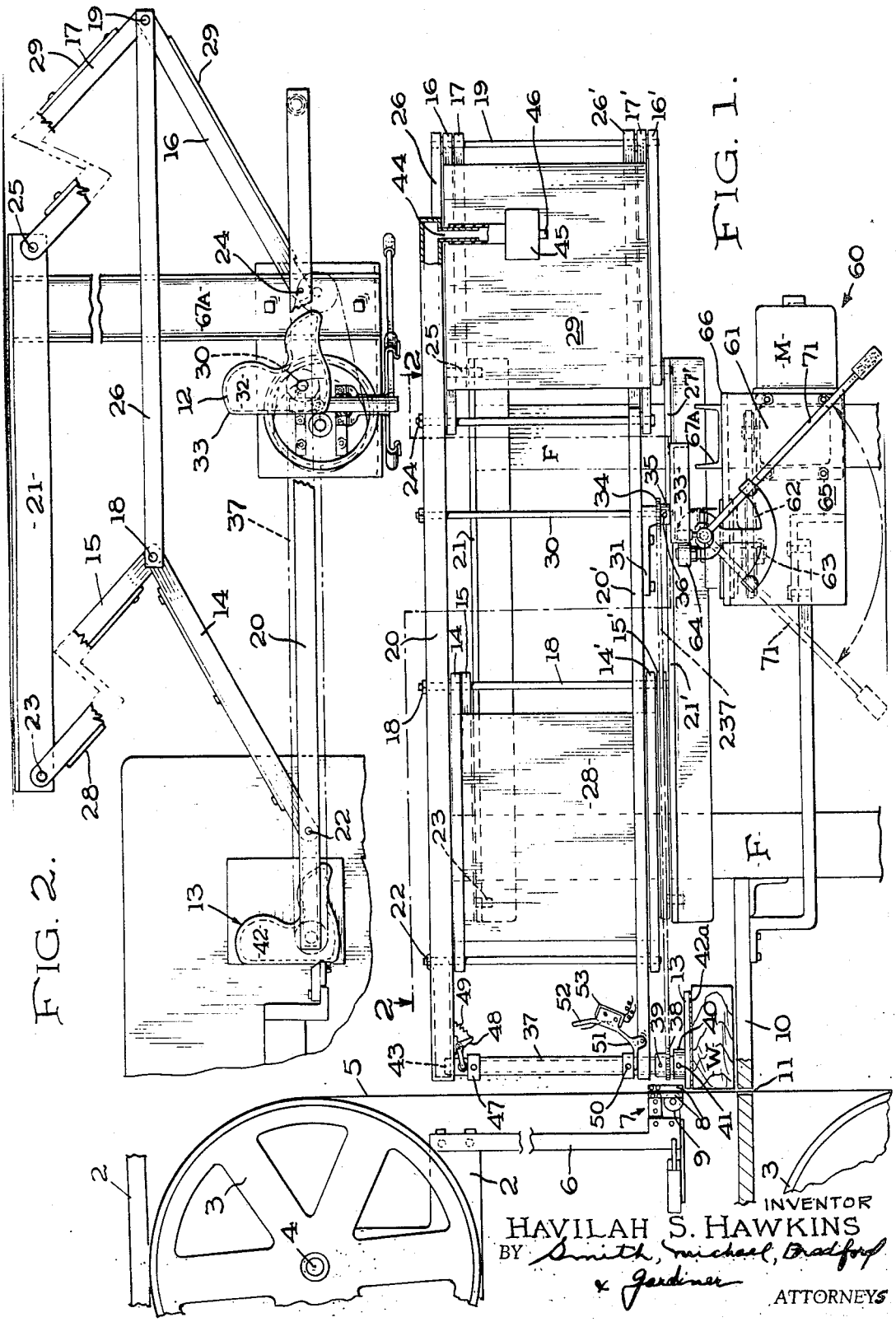

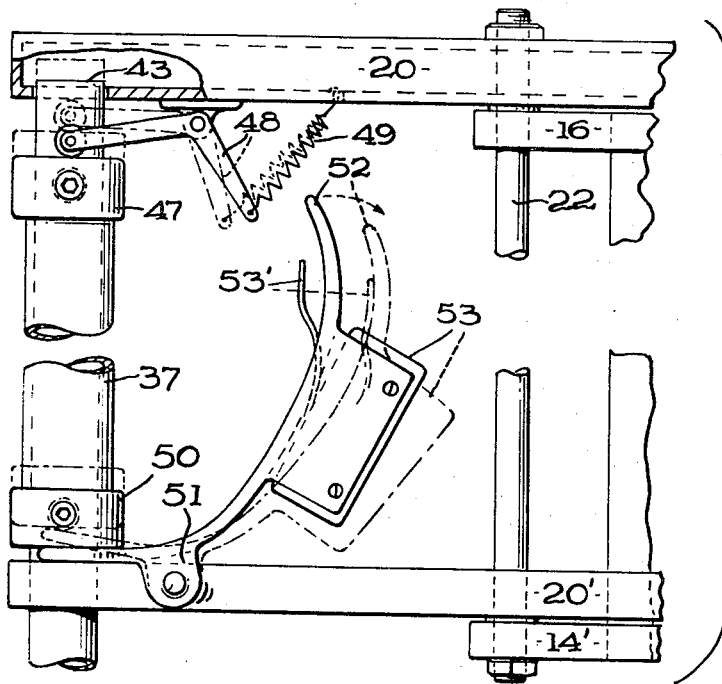
FIG. 5.
FIG. 7.
FIG. 6.
INVENTOR
HAVILAH S. HAWKINS
BY
ATTORNEYS
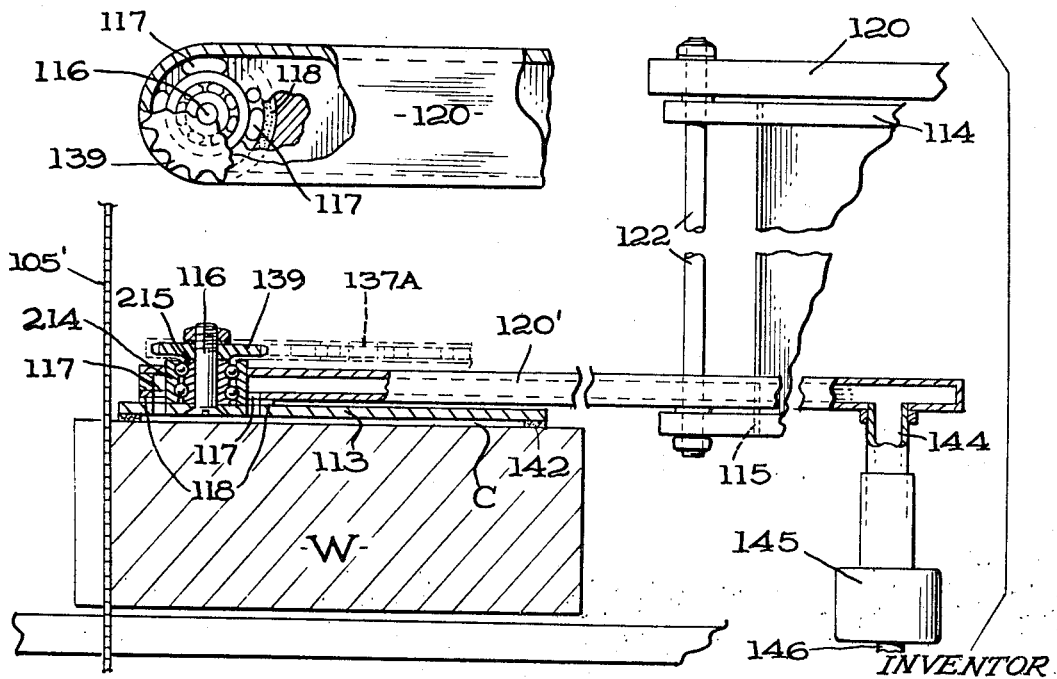

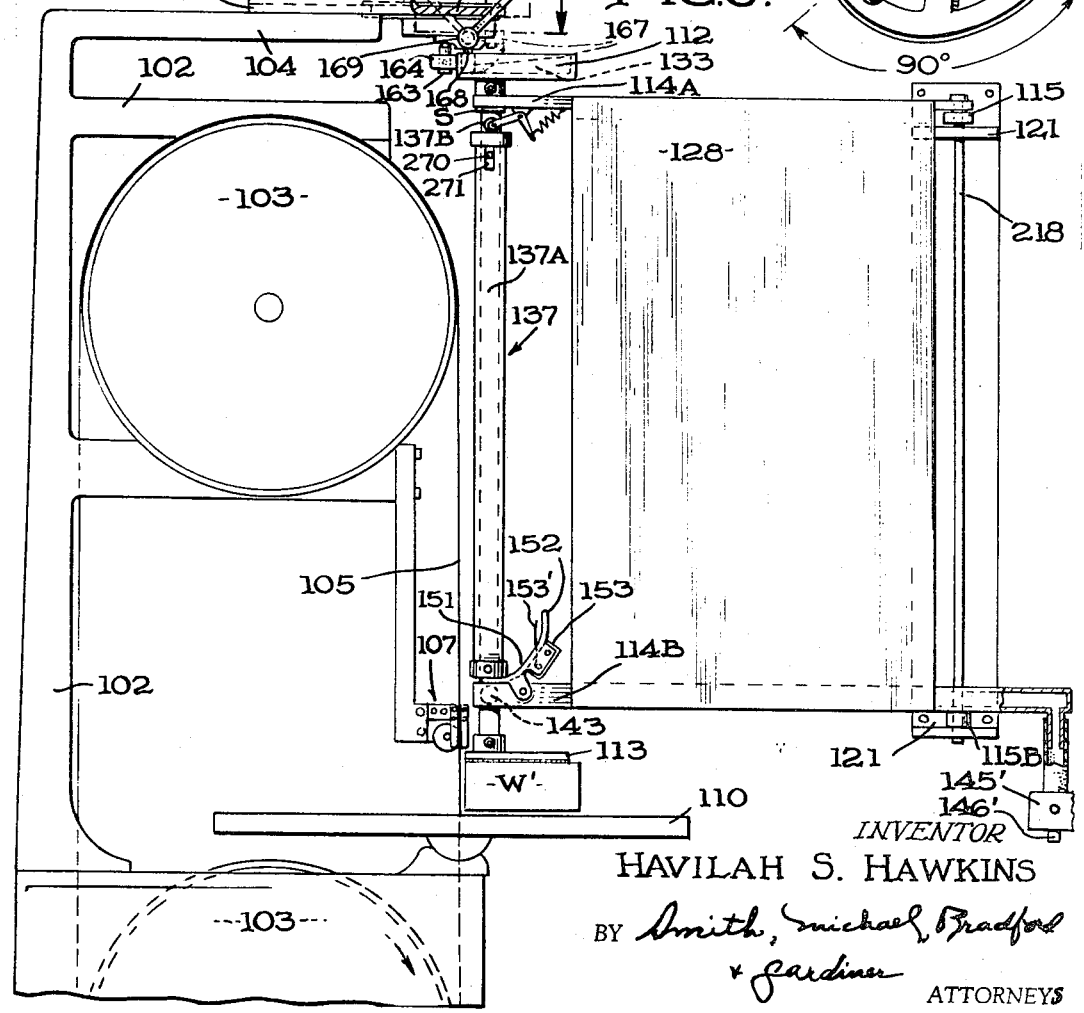

United States Patent Office 3,476,159
Patented Nov. 4, 1969

3,476,159
WORK FEED MECHANISM FOR BANDSAW MACHINES
Havilah S. Hawkins, Sedgwick, Maine 04676
Filed Mar. 10, 1967, Ser. No. 622,145
Int. Cl. B27b 25/00, 13/00
U.S. Cl. 143—26                                 20 Claims

ABSTRACT OF THE DISCLOSURE

This disclosure describes an arrangement wherein a pattern member remotely disposed with respect to the saw and a member arranged to support a work piece in operative proximity to the saw and free of frictional contact with the machine are mounted on a movable support and are connected for concurrent and synchronized rotation about axes parallel to the cutting edge of the saw and lateral movement transverse thereto, and a fixed axis drive roller operatively engaging a contoured flange of the pattern member synchronously to rotate and transversely move the pattern member and the work piece support to feed a work piece to the saw in response to the control contours of the pattern.

---

This invention is a pattern-controlled mechanism for successively feeding work pieces to a bandsaw machine whereby the work pieces may each be provided with a peripheral contour corresponding to that of the control pattern.

The present work feed mechanism is designed to improve and simplify the construction of the work feed mechanism of my earlier Patents 2,934,107, 3,014,510, 3,068,913 and 3,196,910.

In my former patents I employed a control pattern mounted upon a work piece and the work piece was fed to the saw by movement thereof upon the work table of the saw machine, in response to control movement imparted thereto by the pattern member. This arrangement required an elaborate system of drive and guide rollers due to the heavy frictional drag of the work piece and its superposed pattern member on the work table. Also some difficulty was experienced in sawing profiles in which cusves of short radius were present.

One object of my invention therefore is to provide a work feed mechanism capable of sawing profiles having curves of shorter radius than can be sawed by the work feed mechanisms of my former patents, and to simplify the drive means for the pattern by reducing the number of drive and guide rolls required.

Another object of the invention is to place the pattern member and its drive mechanism at a point remote from the cutting area of the saw and provide a work piece supporting chuck member in close proximity to the saw blade of the machine and to interconnect the pattern mechanism and the work supporting chuck for synchronized movement with respect to the cutting edge of the saw.

Another object of the invention is to mount the pattern member and the work supporting chuck member on a movable support for synchronized rotation about axes parallel to the cutting edge of the saw and permitting said axes to shift laterally with respect to said cutting edge while retaining said parallel relation with the saw blade.

Furthermore I mount the pattern member and work chuck on a movable support so designed as to permit the assembly to be swung clear of the saw for ready replacement of pattern members and/or for repair or replacement of the saw blade.

A further object of the invention is to provide a vacuum chuck member disposed above the work table of a sawing machine for supporting a workpiece so as to relieve the friction which would otherwise develop between the workpiece and the table top during sawing. This arrangement permits a workpiece to be secured to and released from the chuck member by simple operation of a valve in a pipe line connected to a source of suction.

Another object of the invention is to provide means in the apparatus described to compensate the inherent tendency of a saw machine to deviate from a straight line kerf, such tendency being known as "run" of the blade.

These and other objects of the invention will become apparent from a consideration of the following specification when read in the light of the accompanying drawings, wherein I have illustrated preferred embodiments of my invention, and wherein:

FIGURE 1 is a side elevation of my invention operatively associated with a saw machine of conventional form, FIGURE 2 is a top plan view of the apparatus of FIG. 1, FIGURE 3 is an enlarged view partly in section showing the manner of mounting the "run" correction plate, FIGURE 4 is a top plan view of the apparatus shown in FIG. 3, FIGURE 5 is an enlarged detail view of the means for raising the vacuum chuck member, FIGURE 6 is a fragmental detail view partly in section of a modified manner of supporting the vacuum chuck on the lower arm of the parallelogram support, FIGURE 7 is a top plan view partly in section of the chuck mounting shown in FIG. 6, FIGURE 8 is a side elevation of a modification, with parts broken away and parts in section, FIGURE 9 is a top plan view of the apparatus shown in FIG. 8, and FIGURE 10 is a perspective view of the handle locking spring catch.

General arrangement

The preferred embodiments of my invention as shown in the drawings are each characterized by an arrangement in which the pattern mechanism is remotely located with respect to a workpiece supporting member, which member is disposed in operative proximity to the saw, by means to support the workpiece free of contact with the work table of the saw machine thus to eliminate the friction drag normally incident to movement of the workpiece upon the table.

The pattern member and work piece supporting member are operatively connected for synchronous movement about axes parallel to the cutting edge of the saw and in a manner to permit these axes to shift laterally of the saw blade while maintaining parallelism therewith. The remote location of the pattern mechanism may be achieved either by a lateral or by a vertical displacement thereof with respect to the cutting area of the saw.

In FIGS. 1 and 2 I have shown an arrangement wherein the pattern mechanism is displaced laterally with respect to the saw blade, while in FIGS. 8 and 9 I have shown the pattern mechanism vertically displaced with respect thereto.

Referring more particularly to FIG. 1, I have here shown the work feed mechanism operatively associated with a band saw machine, the essential parts of which include a structural frame, portions of which are shown at 2, saw band pulleys 3—3 mounted on said frame for rotation about generally horizontal, vertically spaced axes, the upper one of which is shown at 4. The pulleys 3—3 are coplanar and a saw band 5 is trained thereabout. One of the pulleys 3—3 may be driven by means not shown, and an arm 6 may be provided to support a blade guide 7 in position so that the blade 5 passes between cheek plates 8—8 with the rear edge of the blade engaging a backup roller 9. Work table 10 is shown provided with an aperture or slot 11 through which the saw blade 5 passes. These parts of the saw machine are all well known and form no part of my invention.

As previously stated, the invention includes a control pattern member and a work piece supporting member mounted for synchronized movements with respect to the cutting edge of the saw, which movements include rotation about axes parallel to the cutting edge of the saw and as well as laterally of said edge while maintaining the parallel relation therebetween. To this end I mount a pattern member 12 and a work piece supporting chuck member 13 on a movable supporting structure which is in the general form of a parallelogram comprising upper link members 14–15 and 16–17. One end of each link 14–15 is pivotally connected together by a pivot member 18 and one end of each link 16–17 is pivotally connected together by a pivot pin 19.

The opposite ends of the links 14–15 and 16–17 are pivotally connected respectively to a pair of longitudinally extending members 20 and 21 at points 22–23 and 24–25 located so as to maintain the links 15 and 17 always parallel to each other and the links 14 and 16 always parallel to each other. To further maintain the links of the structure just described, in the desired parallel relation, the pivot members 18 and 19 are connected by a longitudinally extending link member 26. The member 21 may be the horizontal flange of an angle iron beam suitably secured to upright structural frame members F—F. To stiffen the linkage structure 14–15, 16–17, 20 and 26, I propose to duplicate this linkage at a level below that of the first-mentioned links, and such duplicate links are correspondingly numbered with the reference characters primed thus 14'–15', 16'–17', 20' and 26'. The inboard ends of links 15' and 17' are connected to the horizontal flange 21', of an angle iron beam secured to the frame members F—F and supported in horizontal parallel relation to the angle beam 21. To further stiffen the supporting parallelogram structures described, panel members 28—28 and 29—29 may be connected to the links 14–14', 15–15', 16–16' and 17–17' as shown. These panels may be made of sheet metal, plywood, plastic or the like.

The parallelogram supporting structure just described provides a floating or freely movable support for the pattern member 12 and the work supporting chuck 13 in a plane perpendicular to the plane of the saw blade. The pattern member 12 is mounted on the lower end of a shaft 30 extending between and journalled for rotation in the longitudianlly extending members 20–20'. A bearing block 31 may be secured to the member 20' as shown, to maintain the shaft 30 against lateral thrust occasioned by a sprocket chain 237 hereinafter referred to.

The pattern member 12 comprises a plate-like base member 32 having a contoured peripheral flange 33 secured thereto (see FIGS. 2 and 3) which flange determines the contour of the kerf cut by the saw as will appear. The shaft 30 carries a sprocket gear 34 at its lower end, said sprocket including a hub member 35 having a set screw 36 by which the gear and hub are secured to the shaft 30. The pattern member 12 may be secured to the hub of the gear 34 by screws (not shown) which pass through holes in the plate 32 of the pattern into threaded holes tapped into the end surface of the hub 35. The sprocket gear 34 is operatively connected by a sprocket chain 237 with the work supporting chuck 13, heretofore referred to. The chuck 13 is supported in proximity to the saw blade 5 by a hollow shaft 37 which extends between and is mounted for rotation in the forward ends of members 20–20' as shown. The lower end of the shaft 37 carries a sprocket gear 38 over which the sprocket chain 237 is trained and said sprocket gear 38 is secured to the shaft 37 by a set screw 39. The sprockets 34 and 8 are of the same diameter and carry the same number of teeth. The work supporting chuck 13 carries an upstanding collar 40 by which the chuck 13 may be secured to said shaft, as by the set screw 41.

The work supporting chuck 13 comprises a generally flat plate 42 (see FIG. 2) having the same general contoured periphery as does the pattern flange 33 but is of slightly lesser dimension, about ⅛ inch or about the width of a saw kerf as will be explained hereinafter. The inside face of the plate 42 of the chuck 13, is provided at its periphery with a gasket 42a secured thereto which not only seals the peripheral edge of the plate to a work piece W as shown but also provides a shallow cavity or chamber (see C in FIG. 6) between the plate 42 and the top surface of the work piece W which functions as a vacuum chamber to maintain the work piece secured to the chuck in a manner to be described.

It will be noted that the shaft 37 is hollow, as is the upper longitudinal member 20 (see FIG. 1). The upper end of the shaft 37 is provided with an aperture 43 in that portion thereof that is received within the hollow interior of the member 20. The opposite end or right-hand end of the member 20 as viewed in FIG. 1, is shown provided with a laterally directed nipple 44 which may be connected to a source of suction (not shown) through a valved connection 45. The valve 45 may be a conventional electromagnetic or solenoid valve normally biased open to place the member 20 and shaft 37 in communication with the vacuum source, through the connection 46, and which when energized, will close to cut off communication with the vacuum source and at the same time will vent the member 20, the shaft 37 and the work chuck to atmosphere thereby to release the work piece from the chuck. The shaft 37 may be mounted to have slight vertical movement, within the members 20 and 20' as shown, and may be provided with a collar 47 against which a spring biased pivoted lever 48 may bear. The lever 48 is pivoted to the underside of the member 20 and tends to resiliently urge the shaft 37 downwardly by spring 49. Any suitable seal means (not shown) may be employed to seal the upper end of the shaft 37 to the member 20 if desired. This structure is more clearly shown in FIG. 5. Near the lower end of the shaft 37 is secured a second collar 50 which may be engaged from beneath by a pivoted lever 51 to raise the shaft 37 slightly when it is desired to release the work piece from the chuck. The operating handle 52 of the lever 51 carries a microswitch 53 with its operating handle 53' cooperatively disposed with respect to the handle 52 of the lever 51 so that when said handle 52 is actuated to raise shaft 37, the switch handle 53' will be simultaneously actuated to energize the solenoid valve 45. Thus the chuck 13 is vented to drop the work piece at the same time the shaft and chuck are raised. This gives adequate clearance between the work table and chuck to quickly remove one work piece and insert another. The microswitch 53 is of a known normally open type and per se forms no part of my invention. It will be understood that the work piece W during the entire sawing operation is out of contact with the work table as previously explained (see FIG. 1).

The pattern drive unit

The pattern drive unit is indicated generally at 60 and comprises a motor M connected to drive a gear reduction mechanism 61 which is belt connected to a pulley 62 secured to a vertical shaft 63 carrying a drive roller 64 at its upper end. The drive unit is shown more clearly in the enlarged views of FIGS. 3 and 4 from which it can be seen that the unit is mounted on the vertical web 65 of an angle iron bracket, the horizontal web 66 of which is secured to the under face of a horizontal channel beam 67A (see FIGS. 1 and 2). The shaft 63 is so oriented with respect to the saw blade 5 that the axis of rotation of said shaft 63 is parallel to the cutting edge of the saw blade 5, and the drive surface of the roller 64 is disposed to engage the outer surface of the contoured flange 33 of the pattern member 12. In order to maintain the flange 33 in operative engagement with the surface of roller 64, I provide a pressure roller 67 mounted in opposition to the roller 64 and on the opposite face of the pattern flange 33. The roller 67 is mounted for rotation on a stub shaft 68 projecting at right angles from a rock shaft 69 supported for rocking movement in bearings 70—70. The shaft 69 may be rocked by a handle 71 to move the roller 67 from the active position in engagement with the flange 33 as shown in FIGS. 3 and 4 to an inactive position displaced 90° in a clockwise direction as viewed in FIGS. 3 and 4 so that the flange 33 of the pattern member 12 may be swung clear of the drive roller 64 when a pattern is to be replaced or changed. Any suitable means such as a spring arm 72 may be mounted on the plate 80 (later described) in position to be engaged by the handle 71 to hold it in operative position. In FIG. 1, the handle 71 is shown in dotted lines in the inoperative position of the roller 67. The spring arm catch 72 is shown more clearly in FIG. 10.

Blade "run" compensation

As previously mentioned herein almost all band saw blades due to inherent characteristics which arise during manufacture possess certain features which impart to the blade a tendency to deviate from a straight line when the operator is trying to cut a "straight" kerf. Principally this tendency is due to the set of the saw teeth, the direction in which the teeth are filed, etc. In order to compensate for this inherent tendency of blades to "run" I provide an adjustable mount for shafts 63 and 68 which carry the rollers 64 and 67. This adjustable mount includes a circular plate 80 mounted for angular adjustment within a circular aperture 81 provided in the horizontal web 66 of the angle bracket which supports the pattern drive unit 60, and the details of the mount are shown on an enlarged scale in FIGS. 3 and 4. The circular aperture is shown at 81 (FIG. 3) and the plate 80 is supported therein for angular adjustment by clamping rings 82—82. As viewed in FIG. 3 the axes of shafts 63 and 68 normally lie in a plane perpendicular to the plane of the saw and passing through the cutting edge of the saw (root of the teeth). If "run" compensation is needed the clamping plates 82 are released and the plate 80 adjusted angularly a proper degree and direction and the plates 82 tightened. The plate 80 in such adjustment is rotated about a center coincident with the line of contact between the roller 64 and the outer surface of the pattern flange 33.

By way of example, if the blade 5 were perfect it would cut a straight kerf parallel to the line OA as shown in FIG. 4. If, however, in a trial run a straight kerf deviates from a line parallel to the line OA in a direction indicated by the line OB due to inherent blade characteristics, this deviation or "run" may be corrected or compensated by adjusting the circular plate 80 angularly in a counterclockwise direction through the angle BOA, and the plate then secured in such adjusted position by the rings 82—82. Any deviation or "run" in the opposite direction would be compensated by a corresponding angular adjustment of the plate 80 in the opposite direction.

It should be here noted that the distance between the outer face of the saw blade 5 to the point of contact between the roller 64 and the outer face of pattern flange 33 is exactly the same as the distance from the axis of shaft 37 to the axis of shaft 30.

Also, the distance from the centerline of the member 20' (projected), to the root of the saw teeth is exactly the same as the distance from the centerline of the member 20' to the axis of roller 64. Thus a line passed through the axes of rollers 64 and 67 perpendicular to the plane of the saw blade 5 will be parallel to the centerline of the member 20'.

In FIG. 6 I have shown a slightly different form of support for the shaft which carries the vacuum chuck (shaft 37 in FIGS. 1 and 2). Thus in FIG. 6 only the lower member 120' of the parallelogram linkage is extended beyond the pivot member 122 which connects the upper and lower links 114–115, and this member 120' is made hollow to carry the vacuum from the vacuum source to the chuck 113 which is rotatably mounted at the forward end of the member 120' as clearly shown in FIG. 6. The forward end of the member 120' carries a bearing member 214 in which is rotatably mounted a sleeve 215 and the chuck 113 is connected to said sleeve by bolt 116 as shown. The upper end of the bolt 116 has secured thereon for rotation therewith a sprocket gear 139 driven by a chain 137A which corresponds to chain 237 of FIGS. 1 and 2 and which is driven by the pattern shaft (not shown) in the same manner as previously described in respect to the apparatus of FIGS. 1 and 2.

The member 120' is hollow as shown, and is connected to a source of suction by nipple 146 and solenoid valve 145 as previously described. Vacuum is communicated to the chuck 113 by communicating holes 117 in the wall of the member 120' and in the chuck 113. A seal 118 is provided as shown to prevent leakage between the chuck and the member 120' and a similar gasket 142 seals the chuck to the work piece. The saw blade is shown at 105' and the work table at 110'.

Operation

With the motor M energized, the band saw machine running, a source of suction connected to the nipple 46, and a proper pattern member attached to the end of shaft 30 as described, the operation is as follows. The handle 71 is moved to dotted line position of FIG. 1, to move roller 67 to inoperative position so the parallelogram linkage may be swung to move the chuck 13 away from the cutting region of the saw blade 5 so a work piece may be inserted therein with safety.

The pattern member 12 is now engaged with drive roller 64 and the pressure roller 67 engaged with the opposite face of the flange 33 by operation of handle 71. This operation moves the work piece into operative position with the saw blade 5 and as the pattern 12 is moved under the combined action of the rollers 64 and 67 and the undulations in the contoured flange 33 the work piece W is synchronously moved due to the chain and sprocket connection between the pattern shaft 30 and the chuck shaft 37 and to the mounting of these members on the floating support provided by the parallelogram linkage.

When the work piece is completely sawed it may be released from the chuck 13 by manipulating the combined levers 52 and 53' as described, to vent the vacuum chuck and to raise the same to facilitate the insertion of a new work piece.

Modifications shown in FIGS. 8 and 9

In FIGS. 8 and 9 I have shown a modified form of my invention in which the pattern mechanism and drive unit are displaced vertically with respect to the cutting area of the saw instead of the lateral displacement which characterizes the first described apparatus. Thus in FIG. 8 I have shown the essential parts of a band saw machine 100 including a structural frame 102 which supports the usual band pulleys 103—103 which pulleys carry the saw band 105 which is guided by saw blade guide 107 and passes through a blade slot in the work table 110 as is usual.

In this modification the pattern drive unit 160 is displaced vertically with respect to the saw table 110, and while this displacement may be above or below the table, I have chosen to show it above the work table, and to this end it is shown mounted upon an upper part 104 of the structural frame of the saw machine. The pattern drive unit in this modification is identical to that previously described in connection with the modification shown in FIGS. 1 and 2, except that in this arrangement it is inverted and turned end for end so that the axis of the pattern roller extends downwardly and the rock shaft which carries the pressure roller is disposed on the opposite side of the shaft which drives the pattern drive roller. Thus the angle bracket is mounted with the horizontal flange 166 thereof secured to the upper surface of the frame part 104 and the vertical flange 165 thereof extending upwardly therefrom. The motor M' and connected gear housing 161 are secured to the inner face of said web by screw bolts, as clearly shown in FIG. 9.

The pattern drive roller 164 is secured to a downwardly directed vertical shaft 163 which is belt driven from the reduction gear unit as shown. The driving surface of said roller is tangent to the projected plane of the blade 105. The pattern member 112 is mounted upon the upper end of a tubular shaft 137 carried by and journalled in a pair of supporting arms or links 114A–114B. The arms 114A–114B have their opposite ends pivotally connected in parallel spaced relation by pivot member 218 which also pivotally connects arms or links 115A–115B, the inboard ends of which are pivotally connected to vertically spaced bracket members 121. The links 114A–114B and 115A–115B form an articulated support for the shaft 137 so that it may move freely laterally of the blade 105 while retaining parallel relation therewith and concurrently rotate about an axis to the cutting edge of the blade, as defined by the tubular shaft 137. The flange 133 of the pattern member 112 may be urged into operative engagement with the drive roller 164 by a pressure roller 167 mounted on stub shaft 168 carried by rock shaft 169, all as previously described in connection with the apparatus shown in FIGS. 1 and 2. The rock shaft may be operated by handle 171 to move the roller 167 from operative to inoperative position, and spring catch 72 is positioned to retain it in operative position as previously described. The catch 72, for clarity is omitted from FIGS. 8 and 9.

The link member 114B is hollow and its interior is in communication by way of aperture 143 with the interior of tubular shaft 137 and by way of the lower open end thereof, is also in communication with the vacuum chuck 113. The opposite end of hollow link 114B is connected to a source of suction by nipple 146' and said communication is controlled by a solenoid valve 145' as previously described in connection with the apparatus in FIGS. 1 and 2. Thus a work piece W' may be secured by vacuum to said chuck and supported in friction relieving relation with the work table 110 as shown.

A pivoted lever 151 together with a microswitch 153 is shown for controlling suction within the chuck and for raising the chuck to release the work piece and provide room for more readily inserting a new work piece, as previously described.

To reinforce the articulated supporting linkage, panels 128 and 129 may be employed to interconnect the upper and lower link members 114A–114B and 115A–115B as shown.

The line of contact between the roller 164 and the pattern flange coincides with the projected root line of the teeth of the saw blade 105.

To correct or compensate the inherent "run" of the saw, it will be understood that the same adjustable circular plate together with the clamping rings therefor as hereinbefore described may be associated with the horizontal web 166 of the angle bracket shown in FIGS. 8 and 9 in like manner as described in connection with the apparatus of FIGS. 1 and 2, except for the fact that in FIGS. 8 and 9 these elements are inverted. For the sake of clarity no attempt has been made to show the details of these elements in FIGS. 8 and 9, inasmuch as they are clearly shown in FIGS. 3 and 4.

In the modification shown in FIGS. 8 and 9 it will be noted that the tubular shaft 137 is shown (see FIG. 8) as being formed of telescoped tubular sleeve sections 137A, 137B interconnected for rotation by a pin 270 projecting radially from one of the sections such as 137B and engaged within a slot 271 provided in and extending longitudinally of the other sleeve section 137A. A spring biased lever 148 bears on the upper end of sleeve section 137A to urge it downwardly. Thus the lever 151 corresponding to lever 51 of FIGS. 1 and 2 may be operated to lift the chuck 113 and a work piece W' supported therein, in a manner similar to that previously described in connection with the lever 51 of the modification shown in FIGS. 1 and 2, the sleeve section 137A sliding upwardly on the sleeve section 137B during this operation. The suitable stop collar S may be secured on the sleeve section 137B to prevent this sleeve section moving upwardly with the sleeve section 137A.

Operation of modification shown in FIGS. 8 and 9

In operation, the apparatus of FIGS. 8 and 9 is similar in all respects to that shown in FIGS. 1 and 2. The articulated linkages 114A–114B and 115A–115B provide a floating mount for the chuck 113 and it in turn supports a work piece in friction relieving relation with the work table 110 while the chuck and work piece are moved with respect to the saw blade, rotationally and laterally under the influence of the undulations in the pattern flange 133. When the sawing of a given piece is completed the levers 152–153' are actuated to raise the shaft 137A and work piece W', and energize the solenoid valve 145' to vent the chuck 113 and thus release the work piece.

In both forms of the invention (FIGS. 1 and 2, and FIGS. 8 and 9) it will be understood that the pattern drive roller rotates on a fixed axis oriented to dispose the work piece within the vacuum chuck in operative position to the saw, when the pattern flange is engaged with the drive roller, and this engagement will result in controlled predetermined movement of the work piece with respect to the saw in response to the patterned contour of said flange, and that by supporting the work piece substantially free of frictional contact with the saw machine table, adequate driving force may be delivered to the pattern member by the single drive roller and associated pressure roller.

It should be noted that in both modifications the pattern member and the vacuum chuck each have the same contoured periphery. The chuck in each instance is slightly smaller in size than the corresponding pattern member by an amount approximating a kerf cut by the saw or about ⅛ inch. This insures maximum contact area between the chuck and work piece and thereby insures the highest degree of securement by the prevailing vacuum within the chamber of the chuck.

In connection with the arrangement of the pattern drive roller and associated pressure roller as described, it will be understood that the essential feature of this drive is to position the rollers on opposite sides or faces of the pattern flange, and that while I have shown the drive roller engaging the outer face of the flange and the pressure roller engaging the inner face of the flange, the relative positions of these rollers may be reversed if desired, without otherwise modifying the described mode of operation.

The disposition of the rock shaft (69 in FIGS. 1 and 2 and 169 in FIGS. 8 and 9) on opposite sides of the axis of rotation of the pattern drive roll shaft (63 or 163) previously referred to may be readily accomplished by rotating the circular plate 66 (FIG. 3) 180° about its axis. The slight difference in required belt length occasioned by this adjustment may be accommodated by the provision of adjustable slots (not shown) for the bolts which secure the motor-gear unit to the supporting bracket.

In the foregoing specification and in the appended claims I have referred to the relationship of the work piece to the top of the saw table of the saw machine to be such as to relieve friction therebetween during sawing and it is to be understood that this concept includes the support of the work piece by the chuck member completely out of contact with the table top so that all such friction is eliminated, as well as to support a substantial portion only of the weight of the work piece by the chuck member so that friction between the work piece and the table top is substantially relieved or reduced.

It will be understood that I have described and illustrated herein certain preferred embodiments of my invention, but that various changes may be made therein as to size and proportion, and arrangement of the parts thereof, without departing from the scope of my invention, the limits of which are defined in the appended claims.

I claim:

1. In a work feed mechanism for bandsaw machines wherein a work piece is fed to a bandsaw under the control of a contoured pattern member in a manner to produce in said work piece a profile of predetermined contour, the improvement comprising means mounting a work piece supporting chuck member and a control pattern member therefor on a support member for 360° rotation about axes parallel to the cutting edge of the saw to be served by said feed mechanism, means mounting said support member for substantially universal movement in a plane perpendicular to said axes, said pattern member being provided with a contoured control surface, a rotatable drive member for said pattern member, means for mounting said drive member for rotation about a fixed axis perpendicular to the plane of movement of said support with said drive member disposed and arranged to operatively engage the contoured control surface of the pattern member to rotate the pattern member and to shift said support member within said plane of movement in accordance with the contours of said control surface, the drive member being dimensioned and disposed with respect to the cutting edge of the saw to be served by said work feed mechanism so that a work piece supported in said chuck member is disposed in operative position with respect to said saw when the contoured control surface of the pattern member is engaged with said drive member, and means for defining within said chuck member a normally open chamber adapted to be closed by a work piece, and means for evacuating said chamber to secure a work piece to the chuck member.

2. The apparatus described in claim 11 wherein said mounting means for said support member includes plural articulated link members at least one of which is hollow and wherein said chuck member is secured to a hollow shaft having communication with the interior of said hollow link member and with said chamber in the chuck member, and means operatively connecting said hollow link member to a source of suction.

3. The apparatus described in claim 2 wherein said articulated links are pivotally connected to form a parallelogram.

4. The apparatus described in claim 1 wherein the chuck member is provided with a contoured periphery corresponding to that of the contoured pattern member but on a scale reduced by substantially the thickness of a kerf to be cut by said saw.

5. The apparatus described in claim 1 wherein the pattern member is provided with a peripheral contoured flange and the drive member is a roller, and wherein one surface of the flange is engageable with said drive roller, and wherein means is provided for maintaining driving engagement between the drive roller and said flange, said means including an idle roller engageable with the other surface of the flange in opposition to the drive roller.

6. The apparatus recited in claim 5 wherein said idle roller is mounted for rotation on an arm projecting radially from a rock shaft which is mounted for rocking movement about an axis perpendicular to the axis of rotation of said pattern member whereby the idle roller may be swung through an arc of approximately 90° to clear the pattern flange for movement of the pattern member transversely away from the drive means therefor.

7. The apparatus recited in claim 1 wherein the pattern member and the work supporting chuck member are mounted on said support means for rotation about a common axis.

8. The apparatus described in claim 7 wherein the work supporting chuck member and the pattern member are provided with corresponding pattern delineations and wherein the corresponding pattern delineations of both members are accurately aligned axially.

9. The apparatus described in claim 7 wherein the line of contact between said drive roller and said flange lies in the plane of the saw blade in alignment with the cutting edge thereof.

10. The apparatus described in claim 7 wherein the pattern member is vertically displaced with respect to the chuck member and is disposed beyond the path of movement of the saw blade.

11. The apparatus described in claim 1 wherein said pattern member and said work supporting chuck member are mounted for rotation about spaced parallel axes and are operatively connected for synchronous rotation.

12. The apparatus described in clim 2 wherein the hollow shaft to which the chuck member is secured is mounted for limited longitudinal movement, with respect to said support, means resiliently urging said shaft to a position in which a work piece in said chuck member is in close proximity to a work table of the saw machine but out of contact therewith, and means to raise said shaft and chuck member when it is desired to release a work piece from said chuck member thereby to facilitate removal of the work piece and the insertion of a new work piece in said chuck member.

13. The apparatus described in claim 12 wherein means are included for concurrently venting the chuck member to atmosphere when the shaft and chuck member are raised.

14. The apparatus described in claim 5 wherein said first and second-mentioned rollers are mounted on an adjustable support member disposed in a plane perpendicular to the axes of rotation of said rollers and means for supporting said adjustable support member for angular adjustment about a center coincident with the line of contact between said first-mentioned roller and said flange.

15. The apparatus described in claim 14 wherein said support member is a circular plate supported in a horizontal plane and wherein clamp means are provided to secure the plate in an adjusted position.

16. The apparatus described in claim 5 wherein said pattern member and said work supporting chuck member are mounted for rotation about spaced parallel axes and are operatively connected for synchronous rotation, the line of contact between said drive roller and said flange is parallel to the cutting edge of the saw and lies in a plane passing through said edge.

17. In combination a bandsaw machine including a supporting frame structure, a pair of saw band pulleys mounted thereon in vertically spaced coplanar relation, a saw band trained about said pulleys, a work table through which the sawband passes, and means for driving said sawband; work feed mechanism for said saw machine comprising control pattern means including a pattern member having a contoured control surface, a vacuum work piece supporting chuck member, support means, means mounting said members on said support means for 360° rotation about axes parallel to the cutting edge of the saw, means mounting said support means for substantially universal movement in a plane perpendicular to said axes and to the cutting edge of the saw, drive means for said pattern member including a rotatable drive member mounted for rotation about a fixed axis parallel to the cutting edge of the saw, said rotatable drive member having a driving surface concentric to said fixed axis and engageable with said contoured control surface of the pattern member, said fixed axis being oriented with respect to the cutting edge of the saw so as to dispose a work piece supported by the chuck member in operative relation to the cutting edge of the saw and out of contact with said work table when the pattern member is in operative engagement with said rotatable drive member, means for maintaining the contoured surface of the pattern member in driving relation with the drive member and means for rotating said drive member, means for connecting the work piece supporting chuck and the pattern member for synchronous rotation while the support means moves bodily transversely of the saw in response to pattern contours in the control surface of the pattern member, means for securing the work piece to the chuck member including a vacuum chamber formed between the chuck member and the work piece and means for evacuating said chamber.

18. The combination recited in claim 17 wherein said fixed axis is mounted on the frame structure of the saw machine and is so disposed that the line of contact between the drive member and the contoured surface of the pattern member is in alignment with the cutting edge of the saw.

19. The apparatus described in claim 2 wherein the work piece supporting chuck member is disposed with respect to the top of a work table of the saw machine so as to position a work piece in said chuck in friction reducing relation to the table top.

20. The apparatus described in claim 19 wherein the chuck member is disposed to support a work piece out of contact with the work table during sawing.

References Cited
UNITED STATES PATENTS

| | | | |
|---|---|---|---|
| 2,341,201 | 2/1944 | Ballard | 33—28 |
| 2,678,070 | 5/1954 | Davis | 144—145 |
| 2,718,702 | 9/1955 | Glass | 144—145 |
| 3,301,287 | 1/1967 | Edwards | 144—144 |

ANDREW R. JUHASZ, Primary Examiner

J. F. COAN, Assistant Examiner

U.S. Cl. X.R.

83—201, 413; 90—13.1, 13.3; 144—145